United States Patent [19]

Hashimoto

[11] Patent Number: 4,813,068
[45] Date of Patent: Mar. 14, 1989

[54] EASILY OPERABLE AUTOMATIC TELEPHONE ANSWERING/RECORDING APPARATUS

[75] Inventor: Kazuo Hashimoto, Tokyo, Japan

[73] Assignee: Hashimoto Corporation, Tokyo, Japan

[21] Appl. No.: 853,409

[22] Filed: Apr. 18, 1986

[30] Foreign Application Priority Data

Apr. 20, 1985 [JP] Japan .................................. 60-85068

[51] Int. Cl.$^4$ ............................................. H04M 1/65
[52] U.S. Cl. ........................................ 379/70; 360/137
[58] Field of Search ........................ 379/70, 74, 76, 77, 379/79; 360/74.4, 137

[56] References Cited

U.S. PATENT DOCUMENTS

| | | | |
|---|---|---|---|
| 4,005,270 | 1/1977 | Darwood | 379/77 |
| 4,421,954 | 12/1983 | Mita et al. | 360/74.4 |

FOREIGN PATENT DOCUMENTS

| | | | |
|---|---|---|---|
| 3003732 | 8/1981 | Fed. Rep. of Germany | 379/79 |
| 55-70949 | 5/1980 | Japan | 360/137 |

OTHER PUBLICATIONS

*Code-A-Phone* ® *Telephone Answering System Model 2530 with Total Remote Command,* Installation and operating booklet ©5/83, p. 2.

Primary Examiner—Alan Faber
Assistant Examiner—James E. Tomassini
Attorney, Agent, or Firm—Lowe, Price, LeBlanc, Becker & Shur

[57] ABSTRACT

An easily operable automatic telephone answering/recording apparatus adapted to operate in response to depression of first, second and third buttons and the number of times of depression. The apparatus is so operated that the outgoing message is recordable and the recorded outgoing message is reproduced and thereafter the apparatus is set in the standby mode when the first operation button is depressed, and that the incoming message is selectively saved in accordance with whether or not the second operation button is depressed, and that reproduction of the incoming message, rewind operation of an incoming message storage medium and fast-forward operation of the same medium are selectively effected when the third operation button is depressed by corresponding numbers of times, and that the incoming message storage medium is stopped when the third operation button is depressed during the reproduction, rewind, or fast-forward operation regarding the same medium.

10 Claims, 11 Drawing Sheets

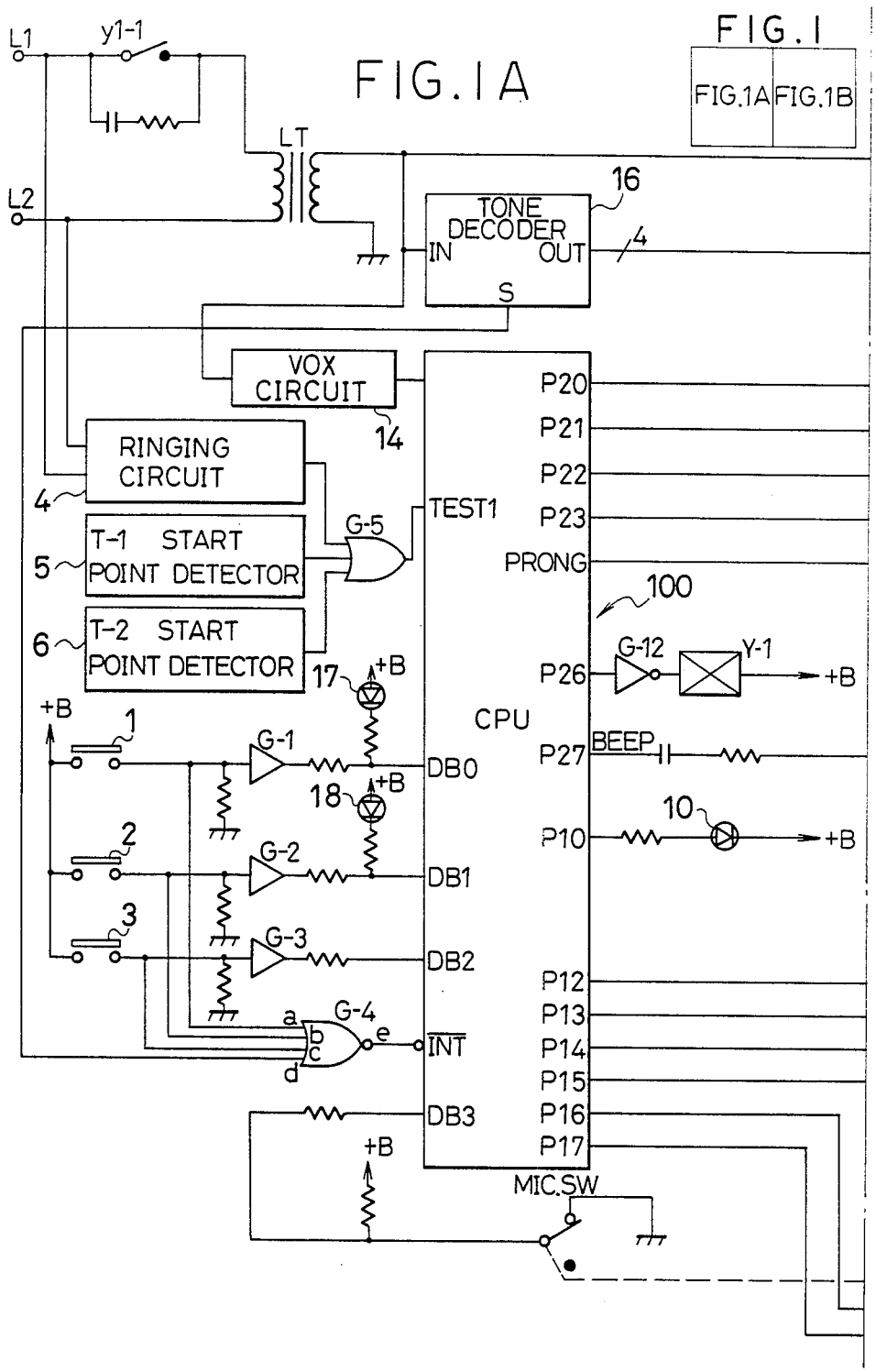

FIG.IB
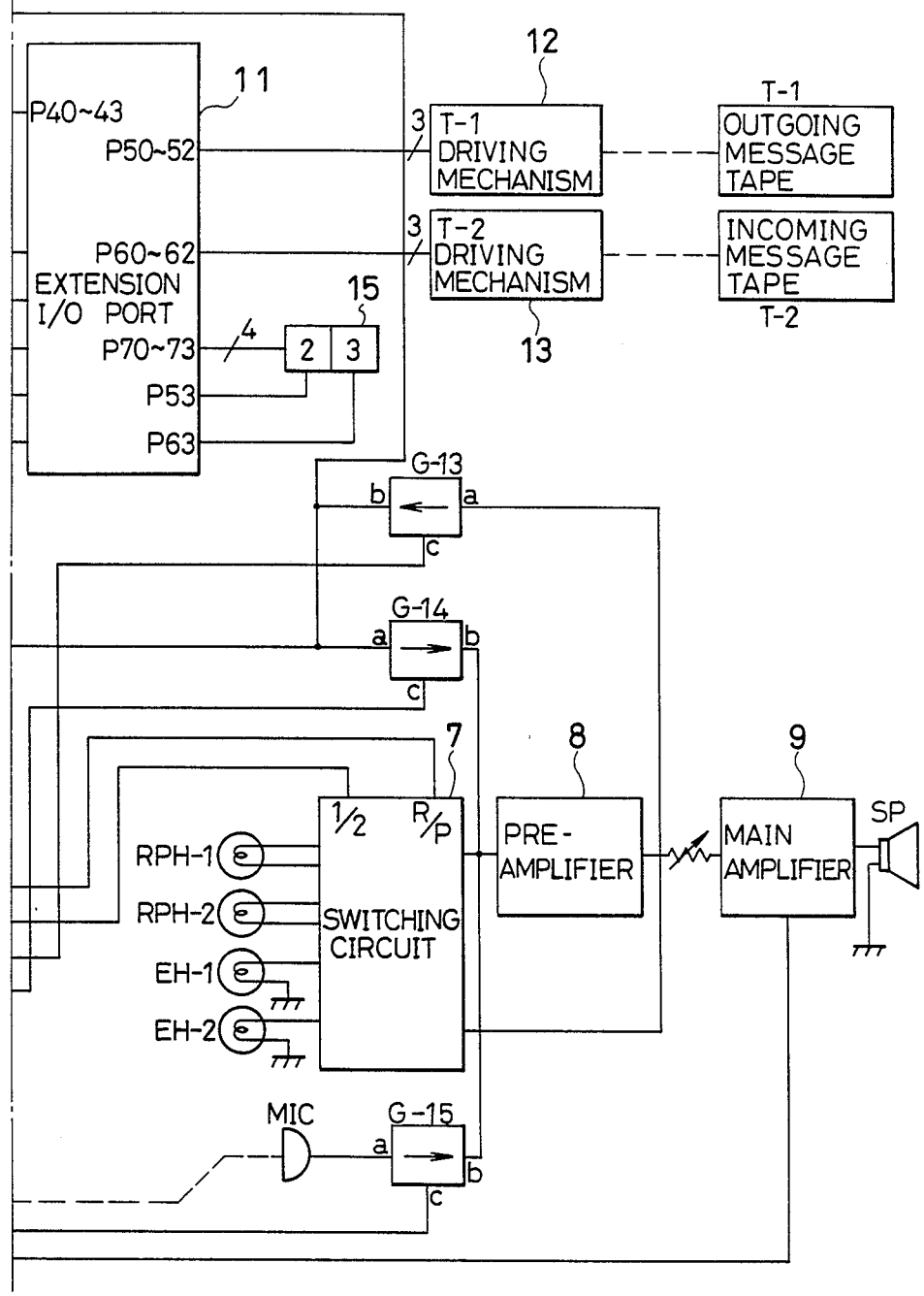

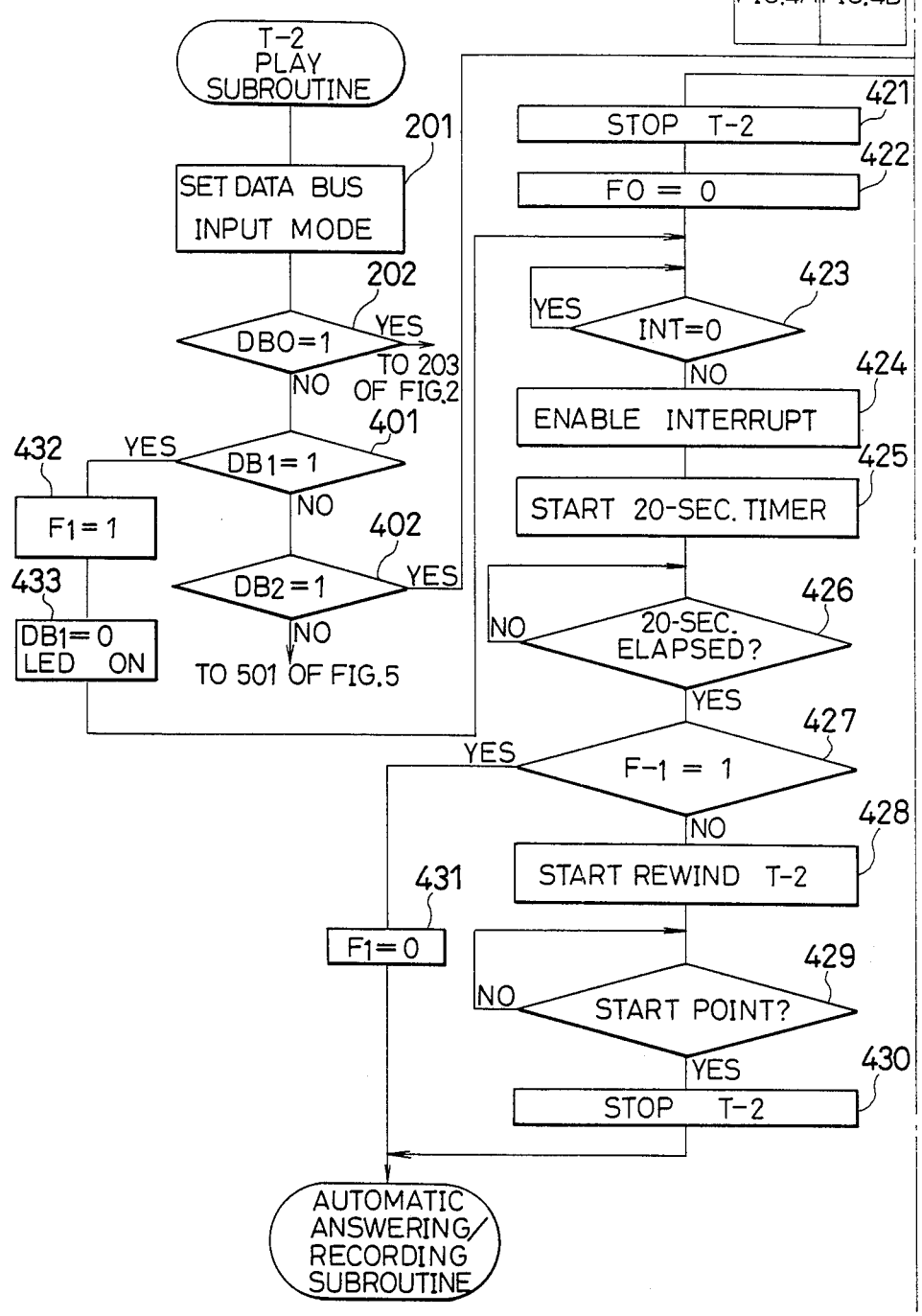

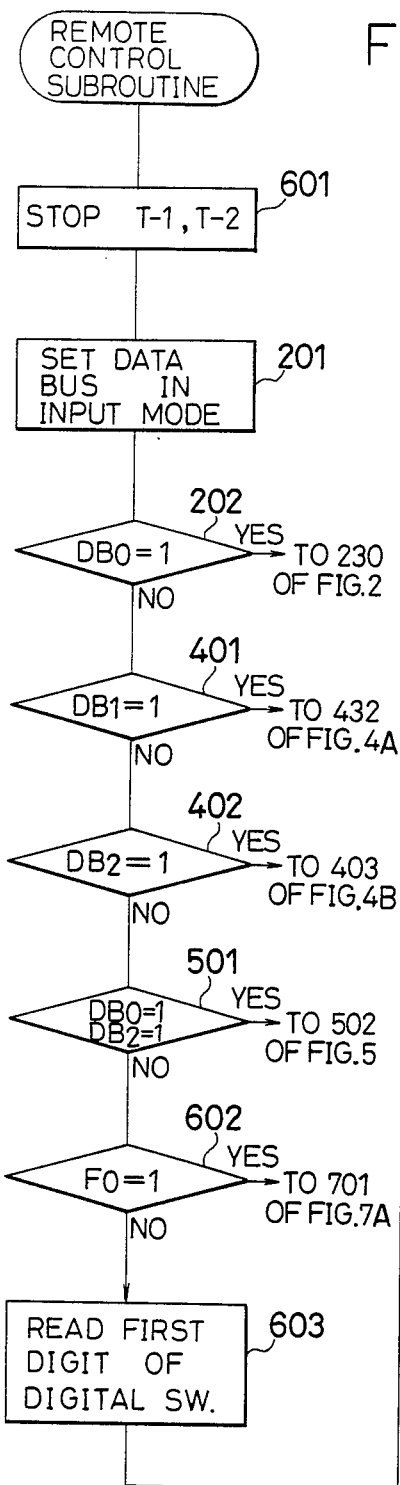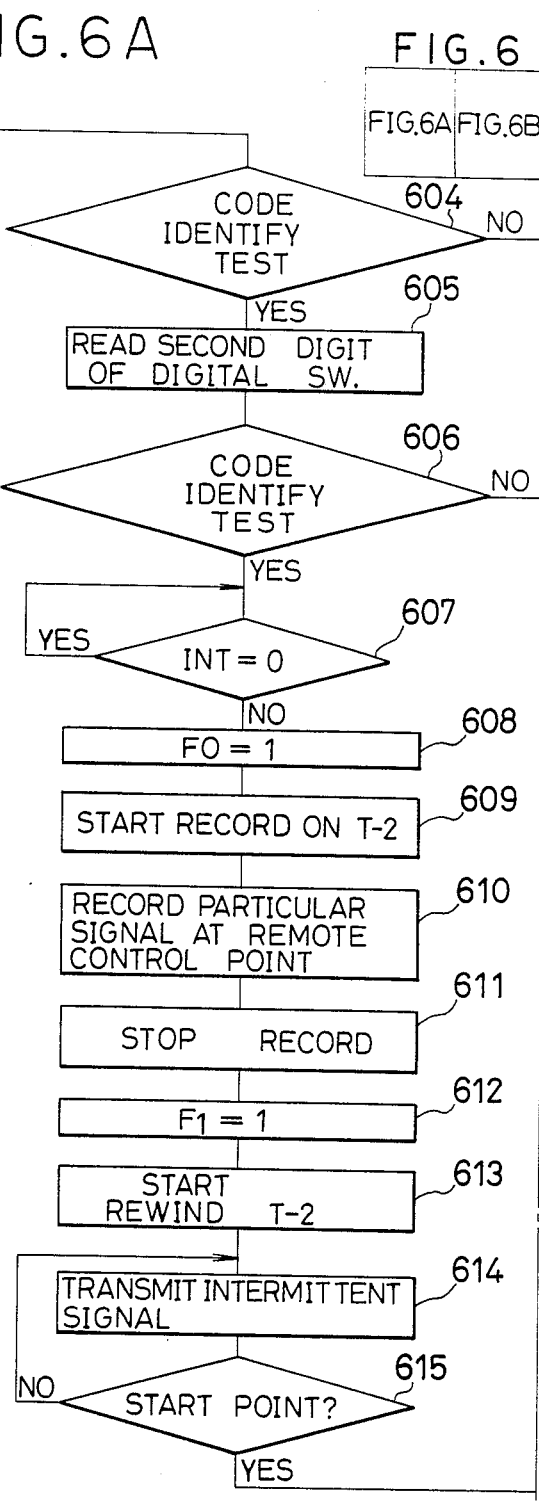
FIG. 6A
FIG. 6
| FIG.6A | FIG.6B |

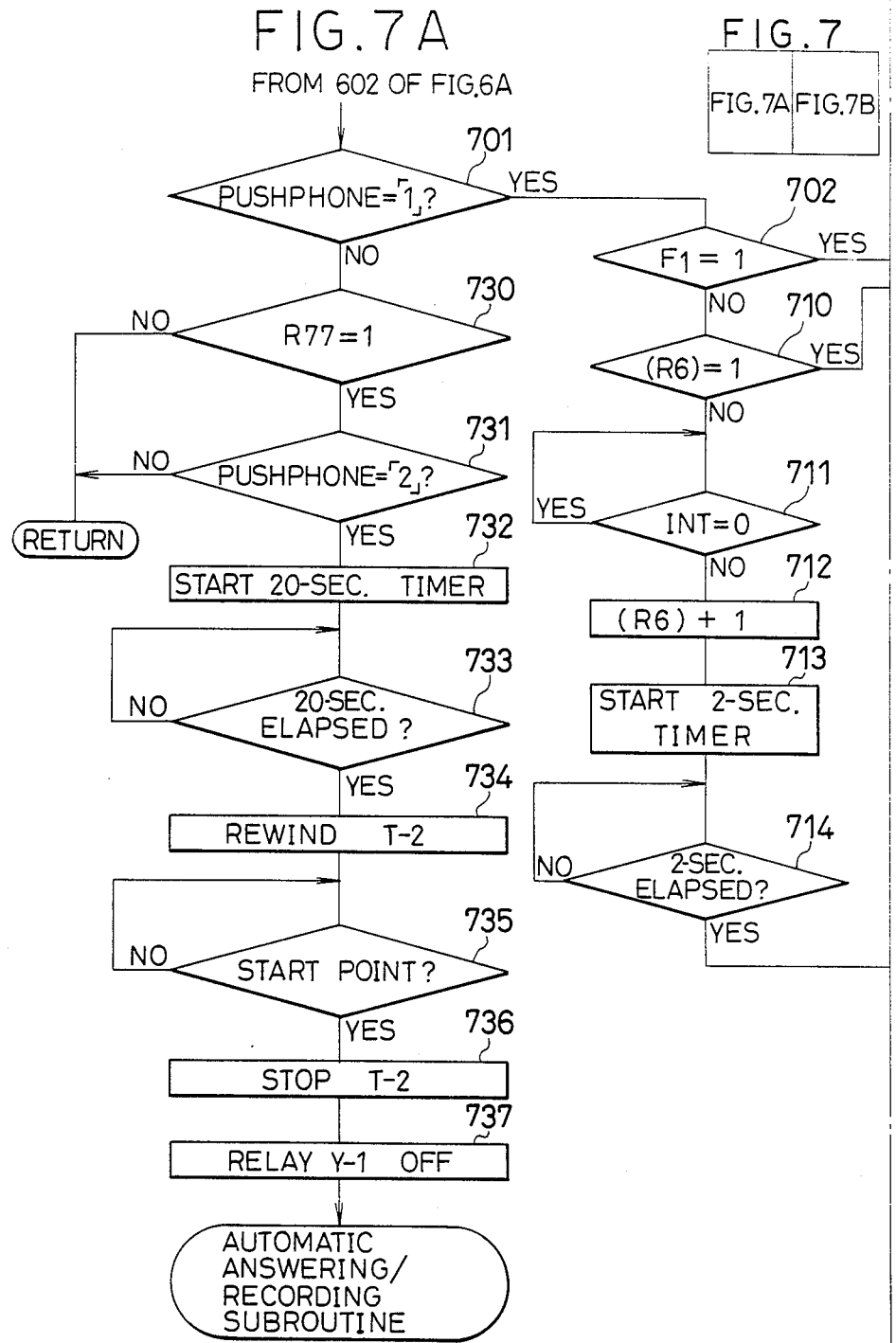

EASILY OPERABLE AUTOMATIC TELEPHONE ANSWERING/RECORDING APPARATUS

BACKGROUND OF THE INVENTION

The present invention relates to an easily operable automatic telephone answering/recording apparatus.

Conventional automatic telephone answering/recording apparatuses have numerous operation buttons, and thus complex in button operation. Due to this complexity users of these apparatuses and persons who wish to purchase an apparatus of this kind tend to have a feeling of unfamiliarity thereto, and lose their will to purchase such an apparatus.

SUMMARY OF THE INVENTION

An object of the present invention is to provide an easily operable automatic telephone answering/recording apparatus, which is operable only by three operation buttons, and is thus capable of eliminating the drawback of conventional automatic telephone answering/recording appratuses such that housewives or other unskilled persons may feel complexity and difficulty in operating an apparatus of this kind.

Another object of the present invention is to provide an easily operable automatic telephone answering/recording appratus capable of recording and reproducing an outogoing message and setting the apparatus in its standby mode by operating a single operation button alone.

A further object of the present invention is to provide an easily operable automatic telephone answering/recording apparatus capable of saving or reserving an incoming message and setting the apparatus in the standby mode so that a new incoming message is recorded on a storage medium at a location following the thus saved incoming message.

A still further object of the present invention is to provide an easily operable telephone answering/recording apparatus capable of reproducing an incoming message recorded on a storage medium, and rewinding and fastforwarding the storage medium, and then stopping travel of the same storage medium, by the use of a single operation button alone.

A still further object of the present invention is to provide an easily operable telephone answering/recording apparatus capable of recording voice from a microphone, and conversation through a telephone line on a storage medium, by the use of two operation buttons simultaneously.

According to the present invention, an easily operable automatic telephone answering/recording apparatus is provided, which is adapted to be engaged with a telephone line to form a loop circuit upon reception of an incoming call, so as to reproduce an outgoing message from an outgoing message storage medium and send the same message onto the telephone line and thereafter record an incoming message of a caller in an incoming message storage medium.

The telephone answering/recording apparatus comprises first, second and third operation buttons each of which is operable to select one or more corresponding operation modes of the apparatus, discriminating means for discriminating selective depression of said three operation buttons and the number of times of depression of each of said three operation buttons and for generating a discrimination signal representative of the result of discrimination, outgoing message recording/playing means for driving said outgoing message storage medium, and for recording said outgoing message in said outgoing message storage medium and reproducing the same message therefrom, incoming message recording/playing means for driving said incoming message storage medium, and for recording said incoming message in said incoming message storage medium and reproducing the same message therefrom, setting means for setting the apparatus in its standby mode for reception of an incoming call, saving means for saving said incoming message recorded in said incoming meassage storage medium, and control means responsive to said discrimination signal from said discriminating means for controlling said outgoing message recording/playing means, said incoming message recording/playing means, said setting means and said saving means.

The telephone answering/recording apparatus is so constructed that when said first operation button is depressed by a first predetermined number of times of depression, the outgoing message is rendered recordable and the recorded outgoing message is reproduced and thereafter the apparatus is set in the standby mode, and that said incoming message is selectively reserved or saved in accordance with whether or not said second operation button is depressed, and that when said third operation button is depressed by second, third and fourth predetermined numbers of times of depression, reproducing operation of said incoming message, rewind operation of said incoming message storage medium and fast-forward operation of the same medium are effected, respectively, and when said third operation button is depressed by a fifth predetermined number of times of depression during the time said incoming message is being reproduced, or said incoming message strorage medium is being rewound or fast-forwarded, said incoming message storage medium is caused to stop.

An advantage of an automatic telephone answering/recording apparatus according to the present invention resides in that when compared with conventional apparatuses of this kind, the apparatus is easily operable only by operating three operation buttons and accurately operable even by housewives and children, and that it provides them with a feeling of familiarity to the apparatus, resulting in enhancing popular use by almost people. Accordingly, the automatic telephone answering/recording apparatus of the present invention provides remarkable social and practical advantages.

BRIEF DESCRIPTION OF THE DRAWINGS

FIGS. 1A and 1B are a schematic circuit diagram of an essential part of an automatic telephone answering/recording apparatus according to an embodiment of the present invention;

FIGS. 4A and 4B are a flowchart for reproducing an incoming message;

FIGS. 6A and 6B are a former half of a flowchart for effecting remote listening operation; and FIGS. 7A and 7B are a latter half of a flowchart for remote listening.

DETAILED DESCRIPTION OF THE PREFERRED EMBODIMENT

Figure 2:
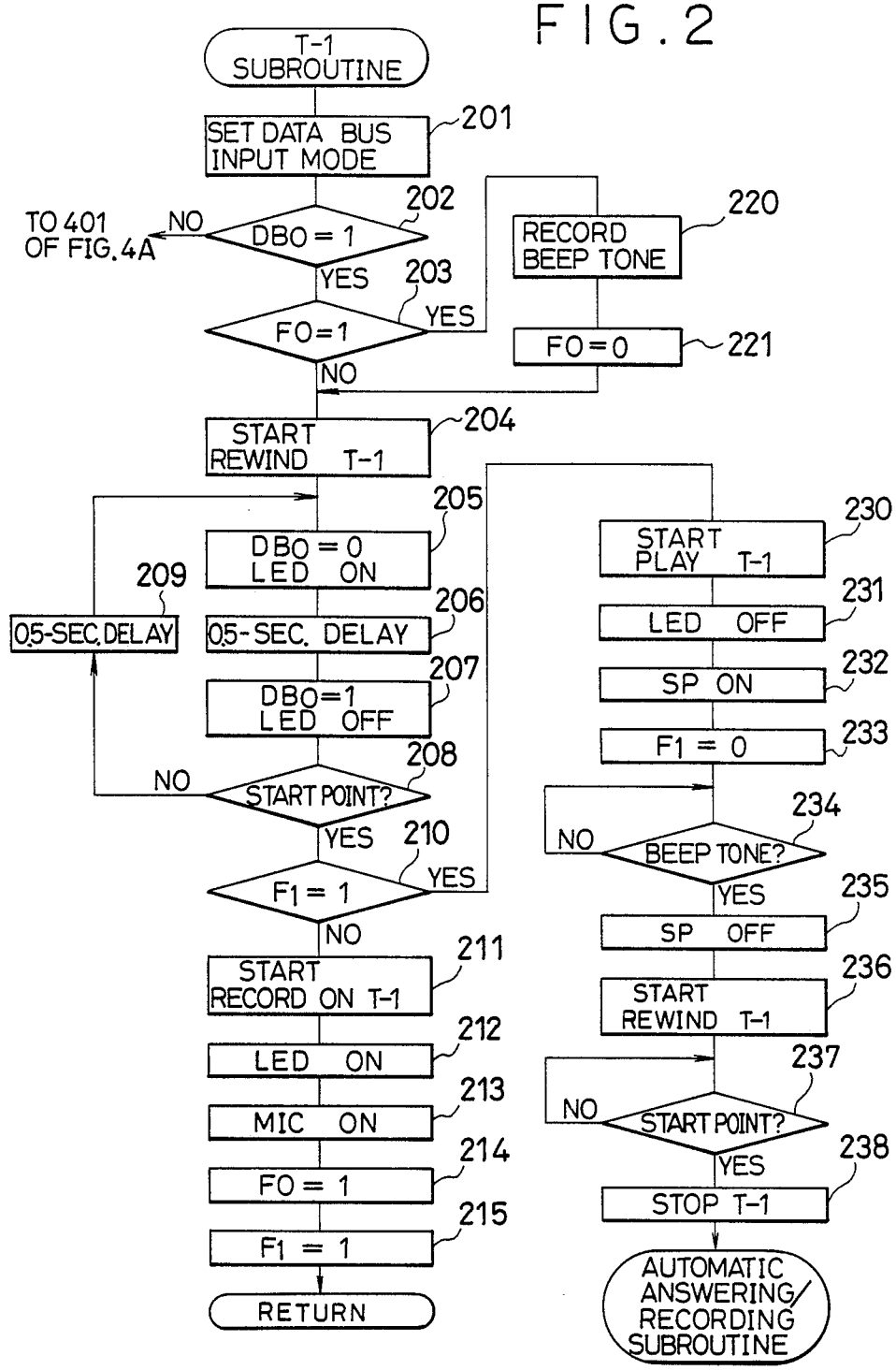
FIG. 2 is a flowchart of a control program effected by the apparatus of FIG. 1 for recording and reproducing an outgoing message.

With reference to the accompanying drawings, an automatic telephone answering/recording apparatus according to an embodiment of the present invention will now be explained.

In FIGS. 1A, 1B the telephone answering/recording apparatus comprises first, second and third operation buttons 1, 2 and 3 for selecting various operation modes (to be described in detail later) of the apparatus. These three operation buttons 1, 2 and 3 are connected through buffers G-1, G-2 and G-3 to data bus terminals DB0, DB1 and DB2 of a microprocessor (hereinafter, referred to as a CPU) 100, which consists of a CPU 8048, for instance. The buttons 1–3 are connected to an interrupt terminal INT of the CPU 100 through a NOR gate G-4, so that an interrupt request is supplied to the CPU 100 through the interrupt terminal INT when one of the three operation buttons 1–3 is depressed or when two of them are depressed simultaneously. One or two depressed buttons are detected by a control program (to be described later) executed by the CPU 100 on the basis of respective levels at the terminals DB0–DB2. Connected to output ports P-20 to P-23 through an extension I/O port 11 are an outgoing message tape driving mechanism 12 for driving an outgoing message tape T-1 as an outgoing message storage medium, and an incoming message tape driving mechanism 13 for driving an incoming message tape T-2 as an incoming message storage medium. These mechanisms 12, 13 are supplied with coded output signals from output ports P50–P52 and P60–P62 of the extension I/O port 11, respectively, for driving the outgoing and incoming message tapes T-1, T-2 in their PLAY, REW (rewind) and FF (fast-forward) modes, and stopping same. Further, light-emitting diodes (not shown) are provided, which permit the user at a glance to confirm whether or not each tape is being traveled.

Connected to an output port P-26 of the CPU 100 is an engaging relay Y-1 having a relay contact y-1 which is operable to engage the telephone lines L1, L2 with the telephone answering/recording apparatus to form a loop circuit in cooperation of a line transformer LT. A light-emitting diode 10 connected to an output port P10 of the CPU 100 is turned on when the apparatus is set in its standby mode for reception of an incoming call, and a light-emitting diode 17 is flashed or turned on continuously to indicate that the apparatus is in its recording mode, whereas a light-emitting diode 18 is turned on to indicate that the second operation button 2 is depressed for reserving the incoming message recorded on the incoming message tape T-2.

A REC/PLAY head RPH-1 and a ERASE head EH-1 for the outgoing message tape T-1, and a REC/PLAY head RPH-2 and a ERASE head EH-2 for the incoming message tape T-2 are connected to a switching circuit 7, respectively. The switching circuit 7 includes an analog circuit and relays, not shown, and has a terminal 1/2 connected to an output port P13 of the CPU 100 and a terminal R/P connected to an output port P-12. Further, the circuit 7 is so constructed that the heads for the outgoing message tape T-1 are selected when the terminal 1/2 is set at H level (logic "1"), whereas the heads for the incoming message tape T-2 are selected when the terminal 1/2 is set at L level (logic "0"), and then the selected REC/PLAY head is operated in REC mode when the terminal R/P is set at H level, whereas the same head is operated in PLAY mode when the terminal R/P is set at L level.

Reference numeral 8 denotes a preamplifier, 9 a main amplifier which is controlled by a signal from an output port P-17 of the CPU 100, SP a loudspeaker, G-13, G14 and G-15 analog switches each having terminals a and b which are rendered conductive with each other when a control terminal c connected to output ports P-14 to P-16 is set at H level. Further, reference symbol MIC denotes a microphone, which is adapted to be plugged in and pulled out from a microphone plug, not shown, which is provided in the telephone answering/recording apparatus, to change a microphone switch MIC.SW in its switching position. That is, when the microphone MIC is pulled out from the pulg, the switch MIC.SW is switched to its lower position in FIG. 1 to set the data bus terminal DB3 at H level so as to permit recording of conversation through the telephone lines L1, L2 if the first and third operation buttons 1, 3 are simultaneously depressed as described later, while voice from the microphone is recordable when the buttons 1, 3 are simultaneously depressed, with the microphone MIC plugged in the plug.

Reference numeral 4 denotes a ringing circuit for detecting an incoming call, 5 a start point detector for detecting a start point of the outgoing message tape T-1, 6 a start point detector for detecting a start point of the incoming message tape T-2, these elements 4 through 6 being connected to a terminal TEST1 of the CPU 100 through an OR gate G-5.

Connected to the extension I/O port 11 is a two-digit digital switch 15 for setting a key code or a condition for initiation of remote control (to be described later) of the telephone answering/recording apparatus by the use of an external telephone set of pushphone type. In case that the key code is set to [23] as shown in FIG. 1, the remote control is initiated only when corresponding bottons [2] and [3] of the pushphone are sequentially depressed so that a particular set of tones or a remote control signal is supplied to the apparatus. Further, a tone decoder 16 is provided, which decodes the remote control signal sent from the pushphone, to supply an output (OUT) to input ports P40 to P43 of the extension I/O port 11, and supply a strobe output S as an interrupt request to the CPU 100 through a NOR gate G-4. Reference numeral 14 denotes a VOX circuit for detecting a beep tone recorded on the outgoing tape T-1 and voice transmitted from the external telephone set, and +B denotes a direct current power source.

Referring to FIGS. 2 through 7, the operation of the automatic telephone answering/recording apparatus constructed above will be explained.

In order to record an outgoing message on the outgoing message tape T-1, after attaching the microphone in the microphone plug, the owner or user depresses the first operation button 1 once. As a result, an interrupt request is supplied to the CPU 100 through the terminals a and e of the NOR gate G-4, and thus the control program executed by the CPU 100 advances to step 201 of FIG. 2, wherein the CPU 100 switches the data buses (DB0 to DB3) to their input mode. Next, at step 202 the CPU 100 checks whether the data bus terminal DB0 is set at logic "1" or not, in other words, whether the first operation button 1 is depressed. If the terminal DB0 is set at logic "1", the CPU 100 determines whether or not a flag (a F0 flag, for instance) is set at logic "1" (step 203), such flag storing a binary value indicative of whether or not the outgoing message tape T-1 is being traveled in its REC mode. Although omitted in FIG. 2, the F0 flag has been cleared to logic "0" when an electric power is turned on to be supplied to the arrangement of FIG. 1", and thus the program advances to step 204, wherein the CPU 100 initiates rewind operation of the outgoing message tape T-1. During the rewind operation, the CPU 100 switches the data buses to output mode, and generates at the data bus terminal DB0 an output alternately assuming logic "0" and logic "1" at intervals of 0.5 seconds, so that the light-emitting diode 18 for indication of REC mode is flashed until when the start point of the outgoing message tape T-1 is reached, to indicate that rewind operation up to the start point is being performed (steps 205–209).

When the tape T-1 has been rewound up to its start point, the CPU 100 checks the stored value of the F1 flag (step 210). At this time, it is determined that the F1 flag is set at logic "0", as will be learned from an explanation hereinbelow and thus the program advances to step 211, wherein the outgoing message tape T-1 is started to travel in REC mode, with the output ports P-12, P-13 set at logic "1". Next, at step 212, since the microphone has been inserted in the plug (DB3=0), the light-emitting diode 17 is continuously turned on to indicate that the outgoing message is recordable. Then, the analog switch G-15 is activated by setting the output port P16 at logic "1" so that the microphone MIC is rendered ON (step 213), and the F0 and F1 flags are set at logic "1" to store that the apparatus is set in REC mode (steps 214, 215).

Upon completion of recording operation of the outgoing message by the use of the microphone MIC, the user depresses the first operation button 1 once again. As a result, the program advances to step 203 through steps 201, 202 to check the content of the F0 flag. At this time, it is determined that the F0 flag is set at logic "1", and thus the program advances to step 220 wherein the CPU 100 supplies a beep tone (BEEP) prepared by a program (not shown) to the REC/PLAY head RPH-1 through the output port P27, the analog switch G-14, etc., so as to record the beep tone on the outgoing message tape T-1 at a location following the recorded outgoing message for a predetermined period of time (2 seconds, for instance). In stead of the beep tone, the outgoing message tape T-1 may be provided with a portion containing no audible signal.

Next, the F0 flag is cleared (step 221) and the outgoing message tape T-1 is rewound up to its start point again (steps 204–208), and thereafter the content of the F1 flag is checked (step 210). Since the F1 flag has been set to logic "1" at step 215, the program advances to step 230. At the step 230, the outgoing message tape T-1 is started to travel in PLAY mode, and the light-emitting diode 17 for indication of REC mode is turned off (step 231). Thereafter, the loudspeaker SP is rendered operative (ON) (step 232) to audibly reproduce therefrom the outgoing message which has been recorded as mentioned above. This enables the user to listen or confirm the content of the recorded outgoing message. The F1 flag is cleared immediately after the reproduction of the outgoing message is initiated (step 233), and the CPU 100 checks whether or not the beep tone recorded on the outgoing message tape T-1 is generated, by monitoring the output from the preamplifier 8 which receives the beep tone through the VOX circuit 14 during the reproduction of the outgoing message (step 234). Upon detection of the beep tone, the laudspeaker SP is rendered inoperative (OFF) and the outgoing message tape T-1 is rewound up to its start point and stopped at that point (steps 235–238). When the tape T-1 is stopped at the start point, the light-emitting diode 10 is turned on and the telephone answering/recording apparatus is set to its standby mode (to be described later), and the control program jumps to or enters an automatic answering/recording program of FIG. 3.

Although, in this embodiment, the outgoing message tape T-1 of the type having two ends is employed, an endless type of tape may be used. In such case, no rewinding operation of the outgoing message tape is required and therefore it is possible to use a more simplified control program for recording and reproducing the outgoing message, in place of the above-mentioned program.

Figure 3:
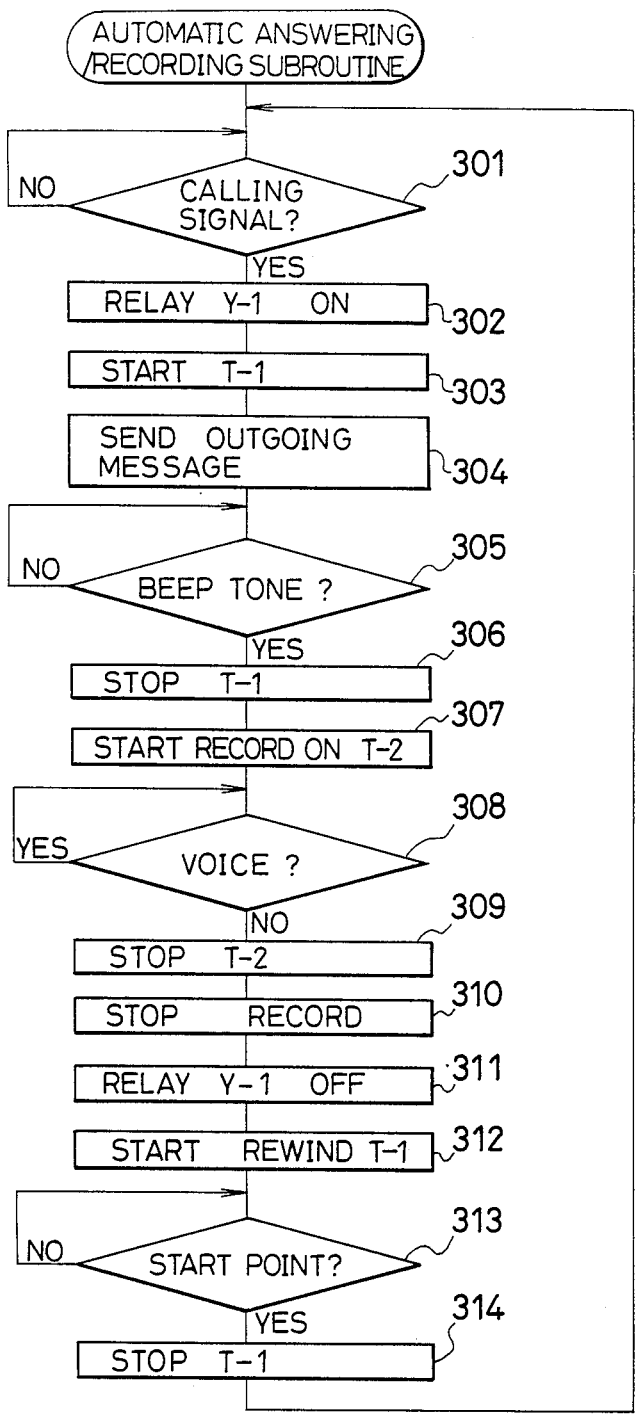
FIG. 3 is a flowchart of a control program for automatic answering/recording operation.

FIG. 3 shows a control program for an automatic answering/recording operation of the telephone answering/recording apparatus, which is initiated in response to an incoming call supplied to the apparatus operated in the standby mode.

At step 301, the incoming call is detected by the CPU 100 which determines the level at the terminal TEST1 to which the output from the OR gate G-5 is supplied through the ringing circuit 4. Upon reception of the incoming call, the CPU 100 sets the output port P-26 at logic "1" so as to keep the engaging relay Y-1 energized to close the relay contact y-1 of the relay Y-1, so that a loop circuit is formed by the clsoed contact to engage the telephone lines L1, L2 with the apparatus (step 302). Next the CPU 100 sets the output from the output ports P50 to P52 of the extension I/O port 11 so that the outgoing message tape T-1 is started, and sets the output from the output port P-14 so that the analog switch G-13 is turned on, and the outgoing message is reproduced by the REC/PLAY head RPH-1 and transmitted onto the telephone lines L1, L2 through the switching circuit 7 and the switch G-13 (steps 303, 304).

During the transmission of the outgoing message, the CPU determines whether the beep tone recorded at the end of the outgoing message is generated, at step 305. In the above-mentioned modification wherein the outgoing message tape is so arranged as to contain a portion without audible signal, the CPU 100 determines whether such portion is reached, instead of detection of the beep tone. Upon detection of the beep tone, the CPU 100 switches the output from the output ports P-50 to P-52 to stop travel of the outgoing message tape T-1, and then switches the output from the port P13 of the CPU 100 and generates the coded output from the ports P60 to P62 of the extension I/O port 11, so that the incoming message tape T-2 is started to travel in REC mode (steps 306, 307). In this REC mode, the CPU 100 detects voice of the caller supplied through the VOX circuit 14. If voice of the caller is not supplied for a predetermined period of time, the CPU 100 detemines that the caller has on-hooked his telephone set, and then switches the output from the ports P-60 to P62 to stop the travel of the incoming message tape T-2 and cancell the REC mode (steps 308–310). Further, CPU 100 controls the respective outputs from the various ports so that the engaging relay Y-1 is deenergized to disengage the telephone lines L1, L2 from the apparatus, and then the outgoing message tape T-1, which is stopped at a location at which the beep tone is recorded, is rewound up to its start point (steps 311–314), and thereafter the apparatus is set in its standby mode.

The above-mentioned operations will be repeated so that messages from various callers will be accumulatedly recorded on the incoming message tape T-2.

In order to listen the thus recorded messages from callers, the user at his home depresses the third operation button 3 once. As a result, the interrupt request is supplied to the CPU 100 as explained above, the control program advances to step 402 through steps 201, 202 and 401. At step 402, the depressed third operation button 3 is detected by the CPU 100, and the program proceeds to step 403. At this time, the content of F0 flag is logic "0" as explained hereinbelow, and thus the program advances to step 404, wherein the CPU 100 checks whether the interrupt terminal INT is set at logic "0" (L level), in other words, whether the third operation button 3 is depressed. As mentioned above, the terminal INT is set at logic "0" so long as any one of the buttons 1–3 is depressed, whereas the terminal INT is set at logic "1" if such depression is released. When the depression of the third operation button 3 is released, the terminal INT is set to logic "1" and thus the program advances step 405. At step 405, the CPU 100 increments the content of a R6 register by "+1". This R6 register is incorporated in the CPU 100 to serve as a counter and adapted to be cleared upon supply of electric power to the apparatus although such operation is omitted in FIG. 4. Therefore, at this time, the R6 register has a value of "1" (decimal notation). At step 406, the CPU 100 allows interruption thereto or is enabled for inerruption, and causes a 1-second timer (not shown) to start (step 407), and checks whether the thus set time period of one second has elapsed (step 408).

In the present embodiment, wherein the tape having two ends is employed as the incoming message tape T-2, the incoming message tape T-2 is now located at a location at which the recorded incoming message ends, and therefore, it is required to rewind the tape T-2 prior to reproduction of the incoming message recorded therein. To this end, the user depresses the third operation button 3 once again (in total twice) within the period of time of one second. As a result, an interrupt request is supplied to the CPU 100 and the program flow to step 404 through steps 201, 202, and 401 - 403. When it is determined by the CPU 100 that depression of the third operation button 3 is released (step 404), the value of the R6 register is incremented by +1 again (step 405) to set the stored value thereof to "2"(decimal notation), and then the program advances to step 409 through steps 406–408 if it is determined that one second has elapsed (step 408). At steps 409 and 410, the CPU 100 determines the content of the R6 register. Since the R6 has been set to "2" at step 405, the program flows to step 414, wherein the R6 register is cleared, and then the F0 flag is set to "1" and rewinding operation of the incoming message tape T-2 is initiated (steps 415, 416). Although omitted in FIG. 4, when the incoming message tape T-2 is rewound up to its start point, the rewinding operation is automatically terminated as in steps 429 and 430 (to be described below), and at that time the F0 flag having been set at step 415 is cleared as in step 422 (described below).

In order to stop the incoming message tape T-2 at its arbitrary position during rewinding operation of the same tape, the user depresses the third operation button 3 once (in total three times). As a result, the program flows to step 403 through steps 201, 201, 401 and 402. Since the F0 flag has been set to "1" at step 415 effected prior to rewinding operation, the answer of the determination at step 403 is affirmative (YES) and then the program advances to step 421, wherein the CPU 100 causes the incoming message tape T-2 to stop. Next, the F0 flag is cleared and the CPU 100 determines whether the depression of the third operation button 3 is released (steps 422 and 423). Upon release of the depressed button 3, the CPU 100 allows an interruption thereto and then causes a 20-second timer (not shown) to start and thereafter checks whether the thus set time period of twenty sencons has elapsed (steps 424–426).

If the user wishes to listen the incoming message recorded in the tape T-2 having been stopped at its arbitrary position as mentioned above, the user depresses the third operation button 3 once (in total four times) immediately after the 20-second timer is started. As a result, the program flows to step 409 through the above-mentioned steps 201, 202 and 401–407. Since the value of the R6 register cleared at step 414 is incremented by +1 at subsequent step 405, it is determined that the value of "1" (decimal notation) is now stored in the R6 register (step 409), such stored value being representative of the number of times of depression, and thus the program flows to step 411 in which the R6 register is cleared. After the F0 flag is set to logic "1" at step 412, the incoming message tape T-2 is driven in its PLAY mode so as to reproduce the incoming message recorded therein (step 413).

In the meantime, if the incoming message tape T-2 is formed by an endless tape, it is not considered that the rewind operation of the tape T-2 is inevitably necessary prior to its play operation, and therefore, the program may be so modified that it enters step 411 when the user depresses the third operation button 3 once for the first time.

If the user wishes to fast-foward the incoming message tape T-2 stopped at its arbitrary position, the user depresses the third operation button 3 three times or more, so that the program flows to step 417 via steps 201–410. At steps 417–419, the R6 register is cleared and the F0 flag is set to at logic "1" and then the incoming message tape T-2 is fast-forwarded.

After listening the incoming message recorded in the incoming message tape T-2 and stopping the same tape as mentioned above, if the user wishes to save or reserve the same incoming message, the user depresses the second operation button 2 once within twenty seconds from the time the 20-second timer is started at step 425. Upon depression of the second operation button 2, the program advances from 201 to step 401 through intervening steps and such depressed button 2 is detected at step 401. As a result, the program further advances to step 432 in which the F1 flag is set to logic "1" and then the data bus terminal DB1 is set at logic "0" (step 433), with the light-emitting diode 18 turned on for indication of SAVE mode. Thereafter, the program flows to step 425 through steps 423, 424 so as to cause the 20-second timer to start again. When the time period of twenty seconds has elapsed and the program advances to step 427, since the F1 flag has been set at logic "1", it is determined that the F1 flag is set at "1" at step 427, and thus the program advances through step 431 to the control program of FIG. 3 for automatic answering-/recording operation, to set the apparatus in its standby mode. As a result, a new message from a caller will be recorded on the incoming message tape T-2 at its location following the end of the saved incoming message. Accordingly, one or more incoming messages from callers which have already been recorded on the incoming message tape T-2 are positively reserved therein.

Figure 4B:
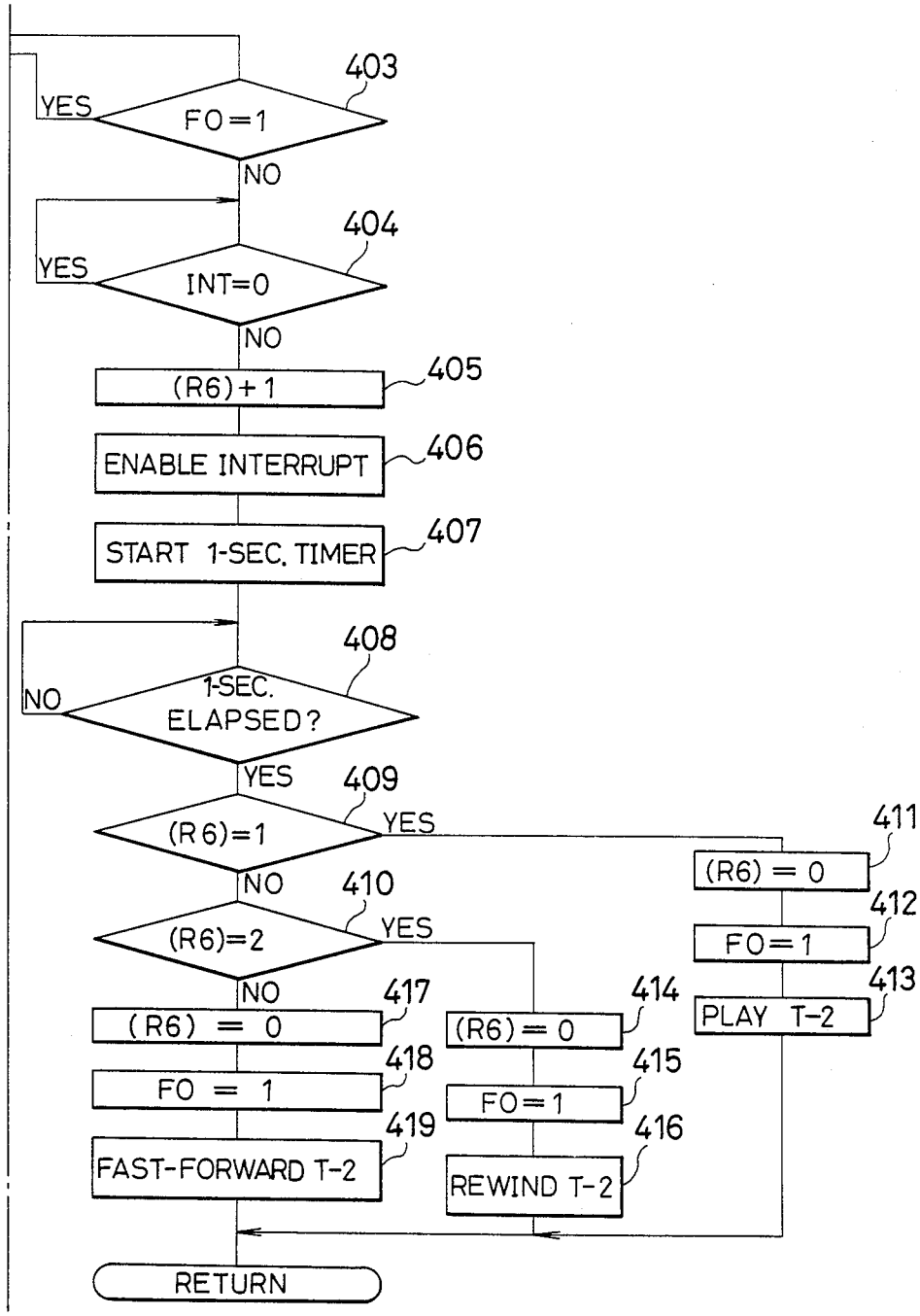
Figure 5:
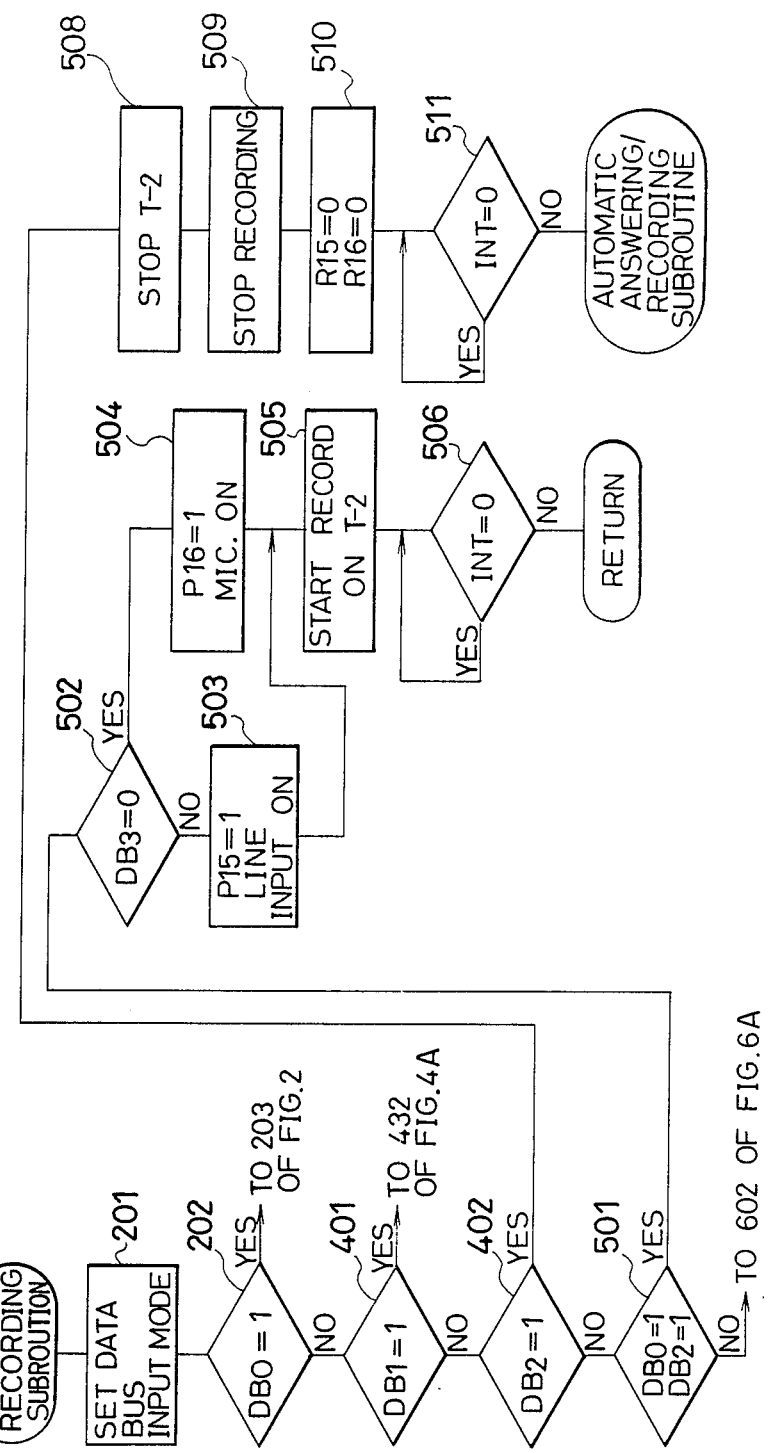
FIG. 5 is a flowchart for recording an incoming message.
Figure 6B:
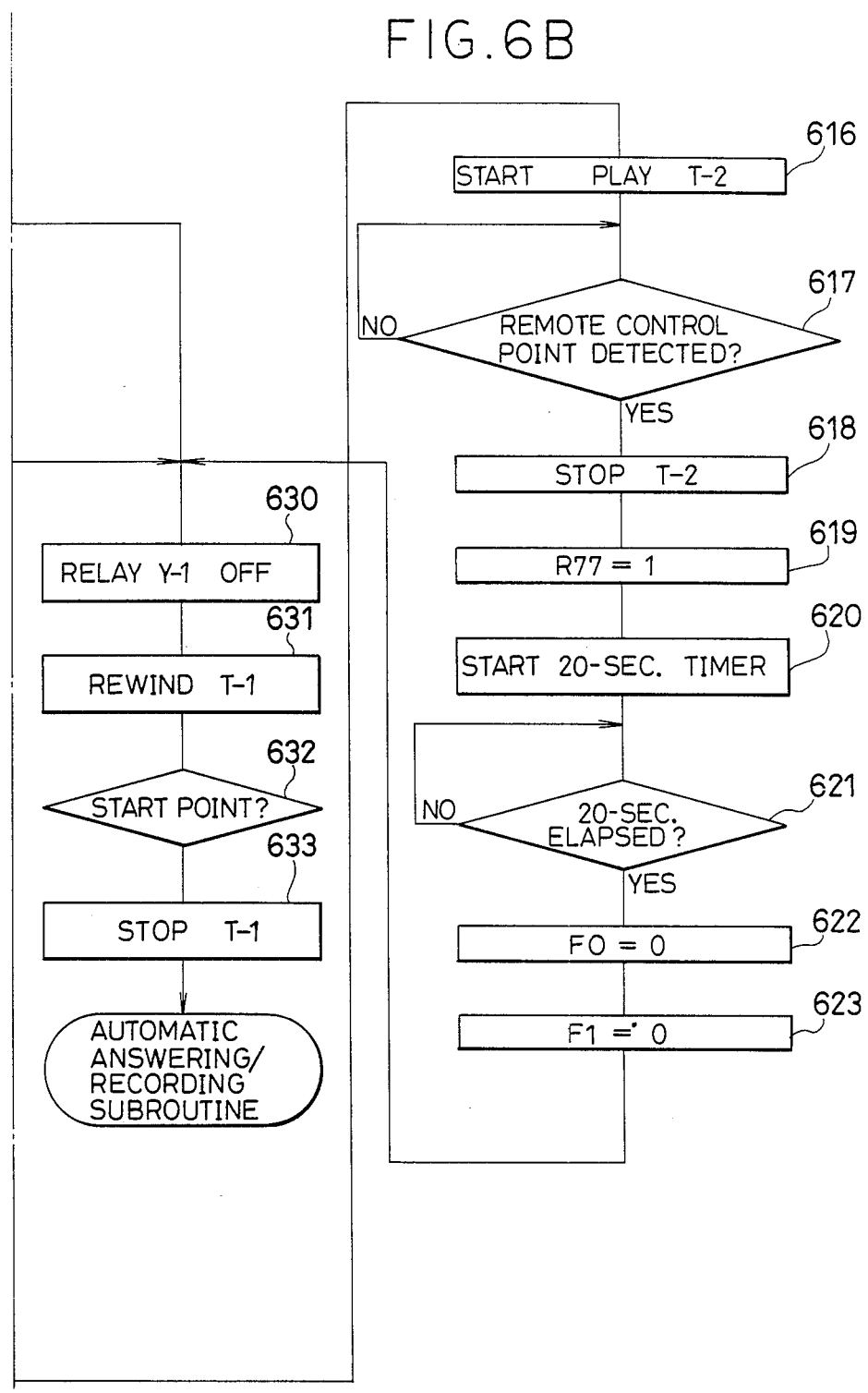

On the other hand, if the user does not depress the second operation button 2 within twenty seconds from the time the incoming message tape T-2 is stopped, the program of FIG. 4 advances from step 427 to step 428 to rewind the tape T-2 up to its start point (steps 428–430), and then advances to step 301 of FIG. 3 for automatic answering/recording operation. In this case, the old messages recorded on the tape T-2 will be erased gradually with advance of recording a new message, which is effected each time an incoming call is received.

The control program of FIG. 4 explained above is so prepared that the recorded incoming messages are saved by depressing the second operation button once after the user listens all the incoming messages. Alternatively, in case that such program is so modified that the program advances from step 433 to step 201, the recorded incoming message can be saved merely by depressing the second operation button 2 during reproduction of the recorded incoming message, with the incoming message tape T-2 not rewound again after the elapse of about 20 seconds, even if the tape T-2 is thereafter caused to stop. Furthermore, the apparatus may be provided with a memory for storing a number of times of rotation of the tape reel (not shown) on which the incoming message tape T-2 is installed, to store the tape position of the incoming message tape T-2 corresponding to the end of the recorded incoming message, so that the tape T-2 is automatically stopped when the stored tape position is reached during the play operation of the same tape. In that case, it is not required to manually stop the incoming message tape at its tape position at which the incoming message ends, resulting in simplified operation of the apparatus. Of course, this type of apparatus may be provided with the above-mentioned saving function for saving the recorded incoming messages.

Further, the telephone answering/recording apparatus is to operable as to record voice from the microphone MIC on the incoming message tape T-2 when the microphone MIC is plugged in the microphone plug (not shown), and record conversation when the microphone MIC is pulled out therefrom.

That is, under the condition that the microphone switch MIC.SW is switched to its position shown in FIG. 1 to set the data bus terminal DB3 at L level, when the first and third operation buttons 1 and 3 are depressed simultaneously, such depression is detected at step 501 to which the program advances from step 201 through steps 202, 401 and 402. Further, if the microphone switch MIC.SW is ON, the program flows from step 502 to step 504 so that the microphone MIC is rendered operative (ON), and the incoming message tape T-2 is driven to start in its REC mode (step 505). Upon disengagement of the depressed buttons, 1, 3 (step 506), the program enters its wait state for subseqent button operation. As a result, voice from the microphone MIC is recorded on the incoming message tape T-2.

On the other hand, when the microphone MIC is pulled out from the plug, the program advances from step 502 to step 503 in which the CPU 100 sets the output port P-15 at logic "1" to turn the analog switch G-14 on, so that conversation transmitted to the switching circuit 7 through the line transformer LT and the switch G-14 is recorded on the incoming message tape T-2 by means of the REC/PLAY head RPH-2.

In order to cancel the these REC mode, the user depresses the third operation button 3 to advance the program from step 402 to step 508 so as to stop the incoming message tape T-2, and then the REC mode is cancelled by switching the level at the output port P15 or P16 at step 509. Thereafter, The CPU 100 sets a R15 register and a R16 register at "0", respectively, and then enters the program of FIG. 3 when the depressed button 2 (steps 510, 511) is released.

Next, remote control operation of the telephone answering/recording apparatus will be explained.

In order to access the apparatus from remote location, the owner or user calls out the apparatus by the use of a pushphone-type external telephone set, and sends a remote control signal onto the telephone line by sequentially operating buttons of the pushphone, which are same in number as first and second digits of a predetermined number (key code), respectively, the key code being set beforehand to a particular two-digit number such as [23] in this embodiment, by the digital switch 15.

First, in this embodiment, the user depresses the button [2] of the pushphone so that a particular tone corresponding to the button [2] is supplied to the one decoder 16 of the telephone answering/recording apparatus through the line transformer LT, to be decoded by the decoder 16. A 4-bit output from the decoder 16 is applied to the input ports P40 to P43 of the extension I/O port 11, and an output from the strobe terminal S of the decoder 16 is applied to the CPU 100 through the OR gate G-14. As a result, an interruption occurs and thus the control program flows to step 601 of FIG. 6. At step 601, the CPU 100 causes the outgoing message tape T-1 to stop when the outgoing message is sent, whereas the CPU 100 causes the incoming message tape T-1 to stop if the incoming message is sent, to prevent the remote control signal from being undesirably recorded on the tape T-2.

Then, the program advances to step 602 through steps 201, 202, 401, 402 and 501. Since the F0 flag has been cleared to logic "0" in step 622 (to be described later) executed during previous remote control operation, the program flows to step 603, to read the first digit ([2] in this embodiment) of the digital switch 15. More specifically, the CPU 100 sets the ports P70 to P73 of the extension I/O port 11 as input ports, and sets the output ports P53 and P63 at logic "1" and "0", respectively, to read the first digit of the switch 15. At subsequent step 604, if it is determined that a first coded remote control signal generated by depression of the button of the pushphone is consistent with the thus read first digit of the digital switch 15, the program advances to step 605 to read the second digit of the digital switch 15, and then the CPU 100 checks whether or not a second coded remote control signal generated by a second button operation is consistent with the second digit of the switch 15 at step 606. If it is determined that they are consistent with each other, the program advances to step 607. The interruption occurs again when the second remote control signal is sent, although a corresponding program is omitted in FIGS. 6A, 6B for simplification.

On the other hand, if either one of the coded remote control siganals is inconsistent with the corresponding digit of the digital switch 15, the CPU 100 operates to disengage the telephone lines L1, L2 at steps 630–633, and rewind the outgoing message tape T-1 up to its start point, and enters the control program of FIG. 3.

At step 607, the CPU 100 checks whether or the remote control signal is being supplied (in the same manner as in the determination as to whether the operation button is being depressed). If it is determined that the remote control signal is no longer applied to the apparatus at step 607, the program advances to step 608 in which the F0 flag is set to logic "1". Thereafter, at steps 610 and 611, a particular signal such as a high-frequency signal of 2,800 Hz, for instance, is recorded on the incoming message tape T-2 at a remote control point (at which the remote control is initiated) for a predetermined period of time (two seconds, for instance), and the F1 flag is set at logic "1" (step 612), and then the rewind operation of the incoming message tape T-2 is initiated at step 613. The F1 flag is set to store that the incoming message tape T-2 is being traveled. During rewind operation, an intermittent signal is transmitted to the calling party (steps 614 and 615). Upon detection of the start point of the incoming message grouped on the tape T-2 (or the start point of a new incoming message), the tape T-2 is driven in its PLAY mode (step 616), and the CPU 100 determines whether or not the particular signal of 2,800 Hz recorded at the remote control point is reproduced (step 617). This determination is effected on the basis of the reproducing output from the tape T-2 supplied to the CPU 100 through the VOX circuit 14. Upon detection of this particular signal, the traveling operation of the incoming message tape T-2 is stopped at step 618.

Next, at step 619, the CPU 100 sets a R77 register (a seventh digit of a R7 register incorporated in the CPU) at logic "1" representing that the remote control point has been detected, and causes the 20-second timer to start at step 620, and then checks whether or not the set time period of 20 seconds has elapsed (step 621). Within 20 seconds, the user can make his decision as to whether he should save the incoming messages recorded on the tape T-2, or permit the messages to be erased, with the tape T-2 rewound up to the start point as described below. That is, if the user wishes to save the recorded message, he performs no button operation within 20 seconds from the time the incoming message tape T-2 is stopped (step 618). In this case, the F0 and F1 flags are cleared, respectively, when the set time period of 20 seconds has elapsed (steps 622 and 623), and the outgoing message tape T-1 is rewound up to the start point after the telephone lines L1, L2 are disengaged from the apparatus (steps 630–633), and then the CPU 100 enters the program of FIG. 3 to set the apparatus in standby mode for reception of an incoming call. In the meantime, the incoming message tape driving mechanism 13 is so arranged that it operates to rewind the incoming message tape T-2 slightly in its tape stopping operation so that the abovementioned particular signal recorded on the incoming message tape T-2 at its remote control point will be automatically erased by a subsequent new message which will be superimposedly recorded thereon.

Next, an explanation will be given as to rewind operation of the incoming message tape T-2 during the abovementioned remote control, which is different from the rewind operation in steps 613–615. This rewind operation is effected when a particular key or a [1] button of the pushphone, for instance, is depressed twice. In case that the [1] button is depressed and then released and thereafter it is kept depressed, the incoming message tape T-2 is rewound while the [1] button is depressed. On the other hand, secondary depression of the [1] button is effected momentarily, the tape T-2 is rewound for a predetermined short period of time.

Figure 7B:
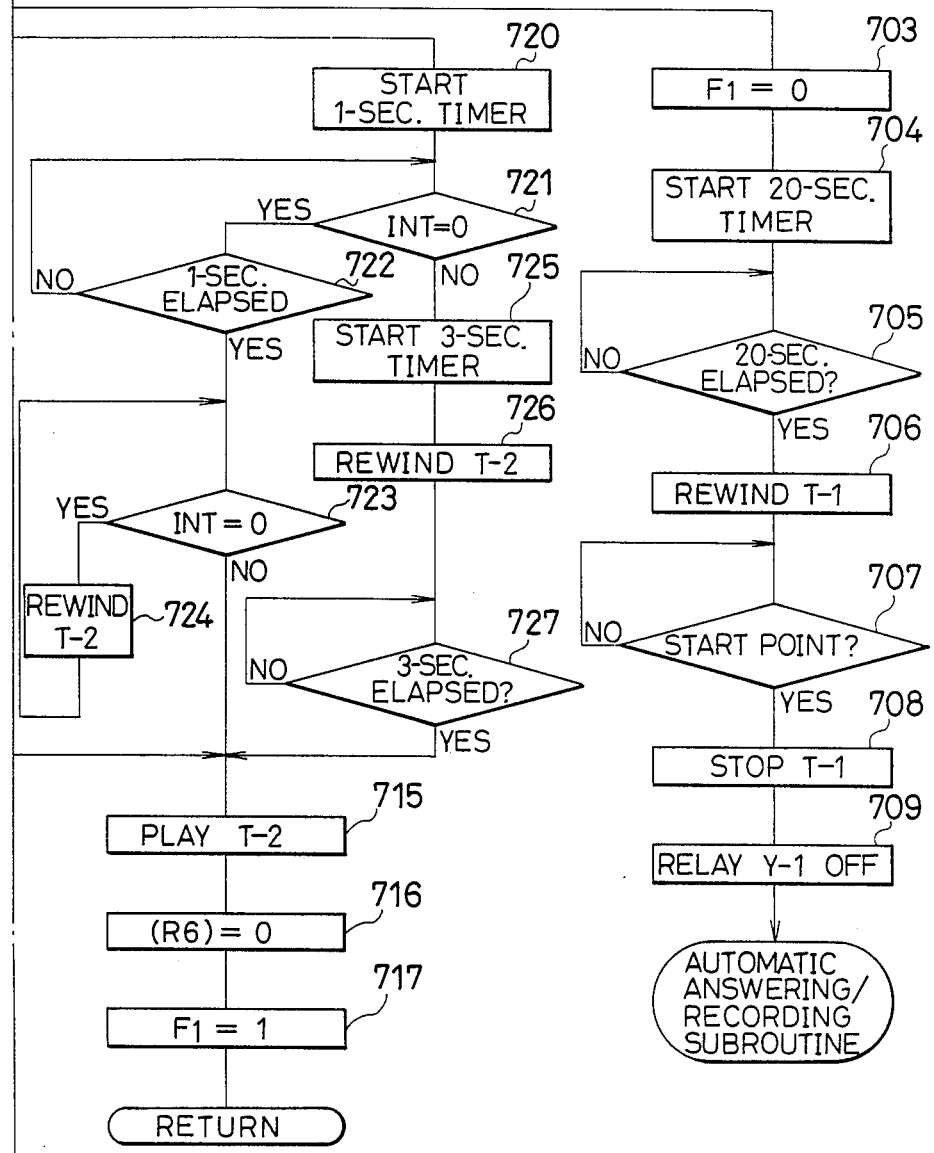

With reference to FIGS. 7A and 7B, a detailed explanation of the rewind operation will be given below.

When the [1] button of the pushphone is depressed once during the time the incoming message tape T-2 is driven in the PLAY mode by the above-mentioned remote control, an interrupt request is supplied to the CPU 100 and thus the tape T-2 is caused to stop in step 601 mentioned above. Thereafter, the program advances to step 701 through steps 201–602 of FIG. 6 and a code corresponding to the [1] button and sent from the pushphone is detected at step 701. Next, the program advances to step 702 and the result of determination therein is affirmative (YES) because the F1 flag indicative of travel of the tape has been set at "1" in step 612 as mentioned above, and thus the program flows to step 703 to clear the F1 flag to "0". Then, the 20-second timer is started (step 704), and the CPU 100 determines whether or not the set time period of 20 seconds has elapsed (step 705). If no remote control signal is sent from the pushphone within 20 seconds, the outgoing message tape T-1 is rewound up to its start point and then the telephone lines L1, L2 a disengaged, and the telephone answering/recording apparatus is set in the standby mode (steps 706–709).

On the other hand, if the [1] button of the pushphone is depressed once within 20 seconds, the code sent from the pushphone is tested again at step 701 and then the program flows to step 702. Since the F1 flag has been cleared at step 703 as mentioned above, the program flows from step 702 to step 710 to check the content of a R6 register having the same function as that of the above-mentioned counter for counting a number of times by which the third operation button 3 is depressed for the at-home control other than the remote control. Since the value of "0" is stored in the R6 register, the program flows to step 711 wherein the CPU 100 tests whether the [1] button is depressed or not. When depression of the [1] button is released, the stored value of the R6 register is incremented by +1 to set the same value to "1" (decimal notation) at step 712. Next, a 2-second timer is started at step 713, and then the CPU 100 determines whether a time period of two seconds has elapsed (step 714). If no remote control signal is received within two seconds, the incoming message tape T-2 is started to travel in the PLAY mode again (step 715). Upon start of the tape T-2, the R6 register is cleared and the F1 flag is set to "1" so as to wait a subsequent remote control (steps 716 and 717).

If the [1] button of the pushphone is depressed again within two seconds at step 714, the program flows to step 710 through steps 701 and 702 to check whether the value of "1" is stored in the R6 register. Since the same register has been set at "1" in previous step 712, the program advances to step 720 to start a 1-second timer. At steps 721–724 forming a test loop, the CPU 100 tests whether the [1] button of the pushphone is being depressed, as in step 711. In this test loop, a test as to whether or not a time period of one second has elapsed is performed at step 722, and the program advances to step 723 if the time period of 1 second has elapsed, with the [1] button kept depressed. At step 723 the CPU 100 also tests whether the [1] button remains depressed or not, and provides a command for rewind operation at step 724 of this test loop. Therefore, the incoming message tape T-2 is rewound as long as the [1] button is kept depressed. When the [1] button is released the program advances from step 723 to step 715, so as to drive the incoming message tape T-2 in the PLAY mode. Thereafter, the above-mentioned steps 716 and 717 are executed.

As is apparent from the foregoing explanation, the program advances to step 722 if the [1] button of the pushphone is depressed repetitively twice. In this occasion, if it is determined at steps 721,722 that the secondary depression of the [1] button is released before the time period of one second has elapsed, the program flows to step 725 at which a 3-second timer is started, and then the rewind operation of the incoming tape T-2 is initiated at step 726. This rewind operation is continuously performed until the time period of three seconds has elapsed, and is then terminated when the operation is switched to the PLAY mode at step 715.

In short, the program advances to steps 713, 714 if the user depresses the [1] button of the pushphone once in a condition that he causes the incoming message tape T-2 to stop. Further, if the user depresses the [1] button of the pushphone again before the time period of 2 seconds set at step 714 has elapsed, the program flows to step 722. At this step 722, if the user continuously depresses the [1] button more than 1 second, the tape T-2 is rewound at steps 723 and 724 so long as the same button is depressed. On the other hand, if it is determined at steps 721, 722 that the [1] button is released within 1 second, the program flows through steps 722, 721, 725 and thus, as shown by steps 726, 727, the user can rewind the tape T-2 for the predetermined period of time or 3 seconds set at step 725.

Further, the automatic telephone answering/recording apparatus in this embodiment is so constructed that, after listening the recorded incoming messages up to the remote control point, if the user decides that it is not required to save these incoming messages, he can rewind the incoming message tape T-2 up the start point and set the apparatus in the standby mode (called as 0 mode) by operating buttons of the pushphone, so that a new message from a caller will be recorded on the tape T-2 at a location following the start point upon reception of a subsequent incoming call.

That is, in a condition that the remote control point has been detected at the above-mentioned step 617 to cause the incoming message tape T-2 to stop and store a value of "1" representative of detection of the remote control in the R77 register (the seventh digit of the R7 register) at step 619, if the user depresses a [2] button of the pushphone, such button operation is detected at step 731 to which the program flows through steps 701 and 730 of FIG. 7A, and then the CPU 100 causes the 20-second timer to start at step 732. When it is determined that the thus set time period of 20 seconds has elapsed, the incoming message tape T-2 is rewound up to the start point, and the engaging relay Y-1 is deenergized to disengage the telephone lines L1, L2, and then the telephone answering/recording apparatus is set in the standby mode (steps 734-737). The reason for providing the above-mentioned wait time of 20 seconds is to provide the user enough time to carry out other remote control operation, where desired.

Next, recording operation of a substitute outgoing message by remote control will be explained.

As to the at-home operation by the user for recording the outgoing message on the outgoing message tape T-1, a detailed explanation has been given above with reference to FIG. 2. That is, in the at-home operation, the apparatus is so operated that upon completion of recording the outgoing message, the outgoing message tape T-1 is automatically rewound and then the same message is automatically reproduced to its end, and thereafter the tape T-1 is automatically rewound up to the start point and the apparatus is set automatically in the standby mode for reception of an incoming call.

Also, even in remote control mode, the telephone answering/recording apparatus is operable to record the outgoing message or the substitute outgoing message in the same manner as in the at-home control mode. Since such function or operation is similar to those effected in accordance with the program of FIG. 2 and the program (FIG., 6) for the above-mentioned remote listening of the incoming message, a control program or a flowchart therefor is omitted. In short, the control program (not shown) may be so prepared that it flows into step 201 of FIG. 2 if the user depresses a particular button of the pushphone (a [3] button, for instance) after the user listens the outgoing message the remote-controlled apparatus, by calling out the apparatus and then sending the key code by the use of pushphone to render the apparatus operable by remote control, as mentioned above. Accordingly, the user can operate the apparatus through remote control for recording the substitute outgoing message, recording the beep tone, etc. by operating the [3] button of the pushphone in the same feeling as in the operation of the operation button 1.

What is claimed is:

1. An easily operable automatic telephone answering-/recording apparatus adapted to be engaged with a telephone line to form a loop circuit upon reception of an incoming call, so as to reproduce an outgoing message from an outgoing message storage medium and send the same message onto the telephone line and thereafter record an incoming message of a calling party in an incoming message storage medium, comprising:

a first operation button;
a second operation button;
a third operation button, each of said three buttons being operable to select one or more corresponding operation modes of the apparatus;
discriminating means for discriminating selective depression of said three operation buttons, for counting the number of times of depression of each said three operation buttons, and for generating a discrimination signal representative of the result of discrimination;
outgoing message recording/playing means for driving said outgoing message storage medium, and for recording said outgoing message in said outgoing message storage medium and reproducing the same message therefrom;
incoming message recording/playing means for driving said incoming message storage medium, and for recording said incoming message in said incoming message storage medium and reproducing the same message therefrom;
setting means for setting the apparatus in its standby mode for an incoming call;
saving means for saving said incoming message recorded in said incoming meassage storage medium; and
control means responsive to said discrimination signal from said discriminating means for controlling said outgoing message recording/playing means, said incoming message recording/playing means, said setting means and said saving means;

whereby the outgoing message is recordable and the recorded outgoing message is reproduced and thereafter the apparatus is wet in the standby mode when said first operation button is depressed by a first predetermined number of times of depression;

said incoming message being selectively saved in accordance with whether or not said second operation button is depressed;

reproduction of said incoming message, rewind operation of said incoming message storage medium and fast-foward operation of the same medium being effected, respectively, when said third operation button is depressed by second, third, fourth predetermined number of times of depression; and said incoming message storage medium being stopped when said third operation button is depressed by a fifth predetermined number of times of depression during said reproduction, rewind, or fast-forward operation regarding said incoming message.

2. An easily operable telephone answering/recording apparatus according to claim 1, further including light-emitting diodes each connected to said control means for indicating a corresponding operation mode in which said apparatus is operated.

3. An easily operable telephone answering/recording apparatus according to claim 1, further including a microphone adapted to be plugged in and pulled out from said apparatus and controlled by said controlling means, whereby voice from said microphone is recordable on said incoming message storage medium when said first and third operation buttons are depressed simultaneously, with said microphone plugged in said apparatus, and conversation is recordable on said incoming message storage medium through the telephone line when said first and third operation buttons are depressed simultaneously, with said microphone pulled out of said apparatus.

4. An easily operable telephone answering/recording apparatus according to claim 1, wherein said apparatus is set in its standby mode by said setting means within a predetermined period of time when said incoming message storage medium is caused to stop by depressing said third operation button during reproduction of said incoming message.

5. An easily operable automatic telephone answering/recording apparatus adapted to be engaged with a telephone line to form a loop circuit upon reception of an incoming call, so as to reproduce an outgoing message from an outgoing message storage medium and send the same message onto the telephone line and thereafter record an incoming message of a calling party in an incoming message storage medium, and operable for remote listening of said recorded incoming message upon reception of a predetermined remote control signal from an external telephone set, comprising:

a first operation button;
a second operation button;
a third operation button, each of said three buttons being operable to select one or more corresponding operation modes of the apparatus;
discriminating means for discriminating selective depression of said three operation buttons and the number of times of depression of each of said three operation buttons, and for generating a discrimination signal representative of the result of discrimination;

outgoing message recording/playing means for driving said outgoing message storage medium, and for recording said outgoing message in said outgoing message storage medium and reproducing the same message therefrom;

incoming message recording/playing means for driving said incoming message storage medium, and for recording said incoming message in said incoming message storage medium and reproducing the same message therefrom;

setting means for setting the apparatus in its standby mode for reception of an incoming call;

saving means for saving said incoming message recorded in said incoming meassage storage medium; and control means responsive to said discrimination signal from said discriminating means for controlling said outgoing message recording/playing means, said incoming message recording/playing means, said setting means and said saving means;

whereby the outgoing message is recordable and the recorded outgoing message is reproduced and thereafter the apparatus is set in the standby mode when said first operation button is depressed by a first predetermined number of times of depression;

said incoming message being selectively saved in accordance with whether or not said second operation button is depressed;

reproduction of said incoming message, rewind operation of said incoming message storage medium and fast-forward operation of the same medium being effected, respectively, when said third operation button is depressed by second, third and fourth predetermined numbers of times of depression;

said incoming message storage medium being stopped when said third operation button is depressed by a fifth predetermined number of times of depression during said reproduction, rewind, or fast-forward operation regarding said incoming message; and a particular signal representative of remote control mode of said apparatus being recorded on said incoming message storage medium upon reception of said predetermined remote control signal;

said recorded incoming message ending at said particular signal being recorded when said external telephone set is on-hooked after completion of listening said incoming message; and a subsequent new incoming message being recorded on said incoming message storage medium at a location following said particular signal.

6. An easily operable telephone answering/recording apparatus according to claim 5, wherein said external telephone set is of a pushphone having a plurality of operation keys, said apparatus including a tone decoder for decoding a tone sent from said pushphone when a particular key thereof is depressed, and a second discriminating means for receiving an output from said tone decoder and for discriminating depression of said particular key to generate a second discrimination signal representative of the result of discrimination, whereby said incoming message storage medium is rewound up to its start point and then stopped at the start point when said particular key is depressed, and a subsequent new incoming message is recorded on said incoming message storage medium at a location following its start point when said pushphone is on-hooked after said incoming message storage medium is stopped.

7. An easily operable telephone answering/recording apparatus according to claim 5, wherein said external telephone set is of a pushphone having a plurality of operation keys, said apparatus including a tone decoder for decoding a tone sent from said pushphone when a particular key thereof is depressed, and a second discriminating means for receiving an output from said tone decoder and for discriminating depression of said particular key to generate a second discrimination signal representative of the result of discrimination, wherein when said particular key is depressed and then released and thereafter it is depressed again within a predetermined period of time, said incoming message storage medium is rewound so long as said particular key is depressed and then said incoming message recorded therein is reproduced, whereas when said particular key is depressed and then released and thereafter it is depressed again and immediately released, said incoming message storage medium is rewound for a short period of time and then said incoming message is reproduced.

8. An easily operable telephone answering/recording apparatus according to claim 5, wherein said apparatus is set in its standby mode when a predetermined period of time has elapsed from the time said incoming message storage medium is stopped after said incoming message recorded therein is reproduced and listened through said remote control.

9. An easily operable telephone answering/recording apparatus according to claim 5, wherein said external telephone set is of a pushphone having a plurality of operation keys, said apparatus including a tone decoder for decoding a tone sent from said pushphone when a particular key thereof is depressed, and a second discriminating means for receiving an output from said tone decoder and for discriminating depression of said particular key to generate a second discrimination signal representative of the result of discrimination, whereby when said particular key is depressed, said apparatus is rendered operable to record a substitute outgoing message sent through said pushphone and then said substitue outgoing message is automatically reproduced.

10. An easily operable telephone answering/recording apparatus according to claim 9, wherein said apparatus is set in its standby mode after said substitute outgoing message recorded is reproduced and confirmed.

* * * * *